United States Patent Office 3,024,235
Patented Mar. 6, 1962

3,024,235
METHOD OF PREPARING TETRACARBOALKOXY-1,4-DIHYDROPYRAZINES
Humphrey I. X. Mager, Leidschendam, and Wouter Berends, Delft, Netherlands
No Drawing. Filed Aug. 26, 1960, Ser. No. 52,063
5 Claims. (Cl. 260—250)

The present invention relates to a new and novel method of preparing 2,3,5,6-tetracarboalkoxy-1,4-dihydropyrazines of the formula:

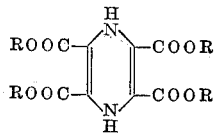

wherein R is a lower alkyl group having 1 to 6 carbon atoms.

Substituted 1,4-dihydropyrazines of the above formula are described by Mager et al., Rec. trav. chim. 76, 28 (1957). These compounds are particularly useful as chemical intermediates, and may be utilized, for example, in the production of alkyd resins by polymerization with polyhydric alcohols.

The method heretofore available for the production of these compounds has been the catalytic hydrogenation of the corresponding pyrazines in the presence of platinum on an alumina catalyst. This reaction requires a high pressure operation, in the order of 100 atmospheres, and these conditions are not always desirable or economical in commercial production.

It is an important object of this invention to provide a commercially feasible method of preparing 2,3,5,6-tetracarboalkoxy-1,4-dihydropyrazines which is characterized by mild reaction conditions and high product yields.

Other objects and the advantages of this invention will become apparent from the following detailed description.

It has now been found that 2,3,5,6-tetracarboalkoxy pyrazines may be reduced to their corresponding 1,4-dihydro derivatives by reacting said pyrazines with a metal salt of dithionous acid in an alkaline reaction medium. The desired 1,4-dihydro compound is obtained in high yields by this procedure.

The esterified pyrazine starting materials employed in said reduction may be obtained by known procedures. For example, Mager et al., Rec. trav. chim. 76, 28 (1957) describe one synthetic pathway which involves the oxidation of o-diaminobenzene with ferric chloride in HCl to a mixture of 2-amino-3-hydroxy-phenazine and 2,3-diaminophenazine followed by oxidation of this mixture with alkaline potassium permanganate to yield pyrazine 2,3,5,6-tetracarboxylic acid or its dipotassium salt. Alternately, the pyrazine tetracarboxylic acid or its dipotassium salt may be prepared by the oxidation of quinoxaline 2,3-dicarboxylic acid with alkaline potassium permanganate. The esterified starting material may then be obtained from the acid or its potassium salt by esterification in anhydrous HCl with an appropriate alcohol. The method of this invention is adaptable to the reduction of any lower alkyl ester of pyrazine 2,3,5,6-tetracarboxylic acid. Consequently, in the esterification reaction, such alcohols as methanol, ethanol, propanol, butanol and the like may be used.

The 2,3,5,6-tetracarboalkoxy pyrazine is reduced to the corresponding 1,4-dihydro derivative in accordance with this invention by reduction in an alkaline medium with a metal salt of dithionous acid. The alkali metal dithionites, such as sodium dithionite, are preferred. The reaction medium is preferably an aqueous solution of a water miscible organic solvent, such as methanol, ethanol and the like. It is essential that the reaction medium be maintained in an alkaline condition. Alkali metal hydroxides and carbonates, such as sodium hydroxide, sodium carbonate and the like, are preferred agents for this purpose.

During the reaction, vigorous agitation of the reaction mixture is essential. It is also desirable that the reaction vessel be continuously flushed with a stream of an inert gas, for example, nitrogen, which is bubbled through the reaction mixture. This serves not only to aid in mixing the contents of the reaction vessel but also to insure that all oxygen is removed.

The following example is included in order further to illustrate the method of this invention, but without being limited thereto:

EXAMPLE 2,3,5,6-Tetracarbethoxy-1,4-Dihydropyrazine

A 250 ml. three necked round flask, fitted with a small (15–25 ml.) dropping funnel, an inlet tube reaching to the bottom of the flask, and an outlet tube, is placed on a powerful magnetic stirring apparatus.

A stirring bar, anhydrous sodium carbonate (4.0 g.) and distilled water (40 ml.) are introduced into the flask. The solution is continuously stirred and a very rapid stream of nitrogen is continuously passed through the apparatus.

As soon as a practically complete removal of oxygen has been effected sodium dithionite (4.0 g.) and water (20 ml.) are added. After solution of the sodium dithionite the cautious addition of 96% ethanol (30 ml.) leads to a clear, reducing water-ethanol solution in an atmosphere of an inert gas.

Immediately after the preparation of this solution the reduction is started by adding a solution of 2,3,5,6-tetracarbethoxy-pyrazine (1.6 g.) in chloroform (10 ml.) drop by drop over a period of about ten minutes. The heterogeneous reaction mixture at once becomes yellow-orange. Then the dropping funnel is rinsed out with a small amount of chloroform (5 ml.) and this is added drop by drop to the reaction mixture during the next five minutes.

A homogeneous, orange-yellow colored solution is obtained 25 minutes after the very first drop of the solution of the ester in chloroform has been added. Then distilled water (100 ml.) is added, the solution remaining absolutely clear, after which the reaction is continued for another five minutes.

The solution containing the dihydro-compound is immediately introduced into a separatory funnel and extracted (5 to 8 times) with 2 ml. portions of chloroform until the last chloroform layer remains colorless.

The combined chloroform extracts are shaken in a separatory funnel with three successive 20 ml. portions of 0.1 N hydrochloric acid and then washed with 20 ml. portions of distilled water until the aqueous layer shows a neutral reaction on indicator paper.

The chloroform extract is dried with anhydrous sodium sulphate and is evaporated to dryness in a vacuum after filtering off the desiccant. To the oily residue is added 96% ethanol (15 ml.) and the solution so obtained is also evaporated to dryness in a vacuum. The residue is then dissolved in a hot mixture of 96% ethanol (5 ml.) and water (10 ml.). This solution is allowed to cool to room temperature with magnetic stirring, whereupon it is placed overnight in an ice-chest at —5°.

Beautiful yellow crystals are filtered off, washed with small portions of distilled water and dried in a vacuum desiccator over phosphorus pentoxide.

The yield of 2,3,5,6-tetracarbethoxy-1,4-dihydropyrazine is 1.2 g. (75% of the theoretical amount): M.P. 129.5–131° (in a sealed, evacuated capillary tube).

A second crop is obtained by evaporating the combined mother liquor and washings to dryness in a vacuum and recrystallizing the residue from a small volume of ethanol-water. In this way a total percentage yields of 90% is obtained.

In order to prevent a (very) slow oxidation to the starting material upon long exposure to air, the 2,3,5,6-tetracarbethoxy-1,4-dihydropyrazine is stored in ampules sealed in an atmosphere of nitrogen.

It is understood that the foregoing detailed description is given merely by way of illustration and that many variations may be made therein without departing from the spirit of our invention.

Having described our invention, what we desire to secure by Letters Patent is:

1. A method of preparing a compound of the formula:

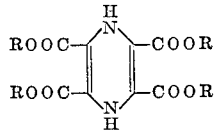

wherein R is a lower alkyl group which comprises reacting a compound of the formula:

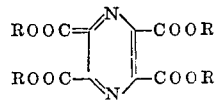

with a metal salt of dithionous acid in an alkaline reaction medium under agitation and under an inert atmosphere.

2. A method according to claim 1 wherein an alkali metal dithionite is employed.

3. A method according to claim 2 wherein said alkali metal dithionite is sodium dithionite.

4. A method according to claim 1 wherein the reaction is carried out in the presence of an inert gas.

5. A method of preparing 2,3,5,6-tetracarbethoxy-1,4-dihydropyrazine which comprises reacting 2,3,5,6-tetracarbethoxypyrazine with sodium dithionite in an alkaline aqueous alcohol solution containing sodium carbonate while passing nitrogen through the reaction mixture.

References Cited in the file of this patent

Ephraim: In Organic Chemistry, (6th English Edition, 1954), pages 569–70.

Mager et al.: Rec. Trav. Chem., vol. 76 (1957), pages 28–34.